(12) United States Patent
Nagase

(10) Patent No.: US 7,626,315 B2
(45) Date of Patent: Dec. 1, 2009

(54) PIEZO-INJECTOR DRIVING APPARATUS

(75) Inventor: Noboru Nagase, Anjo (JP)

(73) Assignee: Denso Corporation, Kariya, Aichi-Pref. (JP)

( * ) Notice: Subject to any disclaimer, the term of this patent is extended or adjusted under 35 U.S.C. 154(b) by 585 days.

(21) Appl. No.: 11/437,770

(22) Filed: May 22, 2006

(65) Prior Publication Data

US 2006/0279592 A1 Dec. 14, 2006

(30) Foreign Application Priority Data

Jun. 10, 2005 (JP) ............................. 2005-170319

(51) Int. Cl.
*H01L 41/09* (2006.01)
(52) U.S. Cl. .................. 310/316.03; 310/317
(58) Field of Classification Search ............ 310/316.03, 310/317
See application file for complete search history.

(56) References Cited

U.S. PATENT DOCUMENTS

| | | | |
|---|---|---|---|
| 6,081,061 A * | 6/2000 | Reineke et al. | 310/316.03 |
| 6,520,423 B1 | 2/2003 | Ricci-Ottati et al. | |
| 6,619,268 B2 * | 9/2003 | Rueger et al. | 123/490 |
| 7,034,437 B2 * | 4/2006 | Fukagawa et al. | 310/316.03 |
| 2001/0035697 A1 * | 11/2001 | Rueger et al. | 310/316.03 |

FOREIGN PATENT DOCUMENTS

| | | | |
|---|---|---|---|
| DE | 103 14 565 A 1 | * | 3/2003 |
| JP | 8-177678 | | 7/1996 |
| JP | A-2000-298963 | | 10/2000 |
| JP | A-2001-100844 | | 4/2001 |
| JP | A-2001-157472 | | 6/2001 |
| JP | A-2002-101673 | | 4/2002 |
| JP | 2002-136156 | | 5/2002 |
| JP | 2003-299371 | | 10/2003 |
| JP | 1 814 167 A2 | * | 8/2007 |

OTHER PUBLICATIONS

Japanese Office Action dated Sep. 30, 2008 issued in counterpart Japanese Application No. 2005-170319 with English translation.

* cited by examiner

*Primary Examiner*—Thomas M Dougherty
(74) *Attorney, Agent, or Firm*—Nixon & Vanderhye PC (57) ABSTRACT

A piezo-injector driving apparatus overcomes disadvantages occurring at the start and the end of charging or discharging of a piezoelectric element while maintaining high responsiveness. At the start and the end of charging a piezoelectric element, the absolute value of a change rate of electrical energy of the piezoelectric element is set lower than in a period between them. Therefore, the pattern of electrical energy of the piezoelectric element is in the shape of the letter S. This prevents an excess of energy supplied to the piezoelectric element at the start of charging and energy supplied to the piezoelectric element at the end of charging.

13 Claims, 10 Drawing Sheets

PIEZO-INJECTOR DRIVING APPARATUS

CROSS REFERENCE TO RELATED APPLICATION

This application is based on and incorporates herein by reference Japanese Patent Application No. 2005-170319 filed on Jun. 10, 2005.

FIELD OF THE INVENTION

The present invention relates to an apparatus for driving a piezo-injector including a piezoelectric element as an actuator.

A conventional piezo-injector driving apparatus controls the expansion and contraction of a piezoelectric element by charging or discharging the piezoelectric element in a multi-switching manner. The multi-switching manner charges and discharges the piezoelectric element while repeatedly increasing and decreasing the amount of current flowing via the piezoelectric element by repeatedly turning on and off a switching device by chopper control.

The capacitance of the piezoelectric element changes greatly with temperatures. Accordingly, even if an electrical state amount having a correlation with an expansion and contraction amount of the piezoelectric element such as a voltage applied to the piezoelectric element does not change, an expansion and contraction amount of the piezoelectric element may change depending on a change in the temperature of the piezoelectric element.

Accordingly, as disclosed in JP-2002-136156A, a driving apparatus makes an on-time in each on-operation on a switching device constant, and switches from an off-operation to an on-operation when a current flowing via the piezoelectric element becomes zero. By performing such on-and-off operations, energy supplied to the piezoelectric element can be kept substantially constant regardless of the temperature of the piezoelectric element.

The following problems may occur with the chopper control in such a mode. Since an energy change is large at the start of charging or discharging the piezoelectric element, a large noise is generated when the injector is driven. Moreover, since an energy change is large at the end of charging the piezoelectric element, the piezoelectric element vibrates heavily. Since an increase in the vibration causes an increase in energy loss, a final shift amount of the piezoelectric element cannot be precisely controlled. Furthermore, since an energy change is large at the end of discharging, when the valve of the piezo-injector opens, and then closes, and the piezoelectric element vibrates heavily, the valve body in the piezo-injector may seat with an increased sound. If the piezoelectric element vibrates heavily at the end of discharging, when regenerative control is performed to restore discharge energy, the amount of energy that can be restored in the piezoelectric element may decrease.

It is possible to set a change in electrical energy of the piezoelectric element small. In this case, however, it takes longer to open or close the valve of the piezo-injector. Since one merit of the piezo-injector is to have higher responsiveness than injectors employing an electromagnetic solenoid or the like as an actuator, reducing the absolute value of a change rate of electrical energy may cause loss of the merit.

Without being limited to the case where electrical state amounts of the piezoelectric element are operated in the above mode, in control of the expansion and contraction of the piezoelectric element, the above problem generally occurs due to an increase of a change in electrical state amounts at the start or the end of charging or discharging.

SUMMARY OF THE INVENTION

The present invention therefore has an object to provide a piezo-injector driving apparatus that can suitably overcome disadvantages occurring at the start and the end of charging or discharging of a piezoelectric element while maintaining high responsiveness.

According to a first aspect, a driving apparatus for a piezo-injector including a piezoelectric element has a driving circuit for controlling electrical state amounts of the piezoelectric element that have a correlation with amounts of expansion and contraction of the piezoelectric element. The apparatus also has a setting circuit and an operation circuit. The setting circuit, in control of at least one of the expansion and contraction of the piezoelectric element, sets the electrical state amounts to increase an absolute value of a change rate of the electrical state amounts after a start of the control, and decrease the absolute value of a change rate of the electrical state amounts before and end of the control. The operation circuit operates the state amounts via the driving circuit to match the set state amounts.

According to a second aspect, the setting circuit sets the state amounts to decrease a change rate of electrical energy of the piezoelectric element at an end of charging the piezoelectric element. The operation circuit operates the state amounts via the driving circuit to match the set state amounts.

According to a third aspect, the setting circuit that sets the state amounts to increase the absolute value of a change rate of the electrical state amounts of the piezoelectric element after the start of discharging the piezoelectric element. The operation circuit operates the state amounts via the driving circuit to match the set state amounts.

According to a fourth aspect, the setting circuit variably sets a pattern for changing the absolute values of change rates of the electrical state amounts in at least one processing of expansion and contraction of the piezoelectric element within one processing period, based on an engine condition or a vehicle condition. The operation circuit operates the state amounts via the driving circuit so that the electrical state amounts match the pattern set by the setting circuit.

BRIEF DESCRIPTION OF THE DRAWINGS

The above and other objects, features and advantages of the present invention will become more apparent from the following detailed description made with reference to the drawings. In the drawings.

DETAILED DESCRIPTION OF THE PREFERRED EMBODIMENT

First Embodiment

Figure 1:
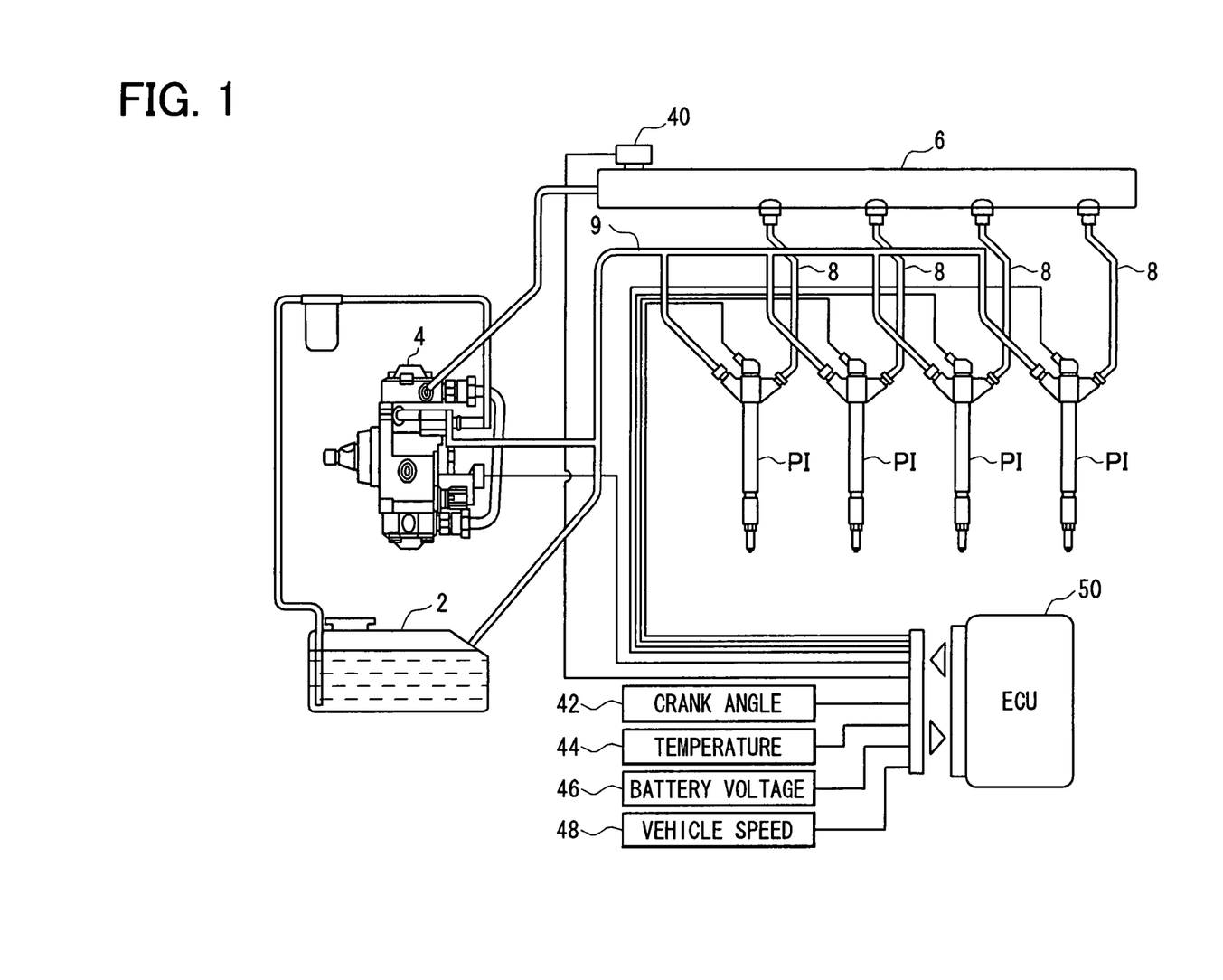
FIG. 1 is a schematic diagram showing an engine system using a piezo-injector driving apparatus according to a first embodiment of the present invention.

In a diesel engine system shown in FIG. 1, fuel in a fuel tank 2 is pumped up by a high-pressure fuel feed pump 4, and fed under pressure to a common rail 6. The fuel stored under high pressure in the common rail 6 is fed to a piezo-injector PI provided at each of cylinders of a four-cylinder diesel engine via a high-pressure fuel passage 8. Each piezo-injector PI is connected to a low-pressure fuel passage 9 to return fuel leaking from it to the fuel tank 2.

Figure 2:
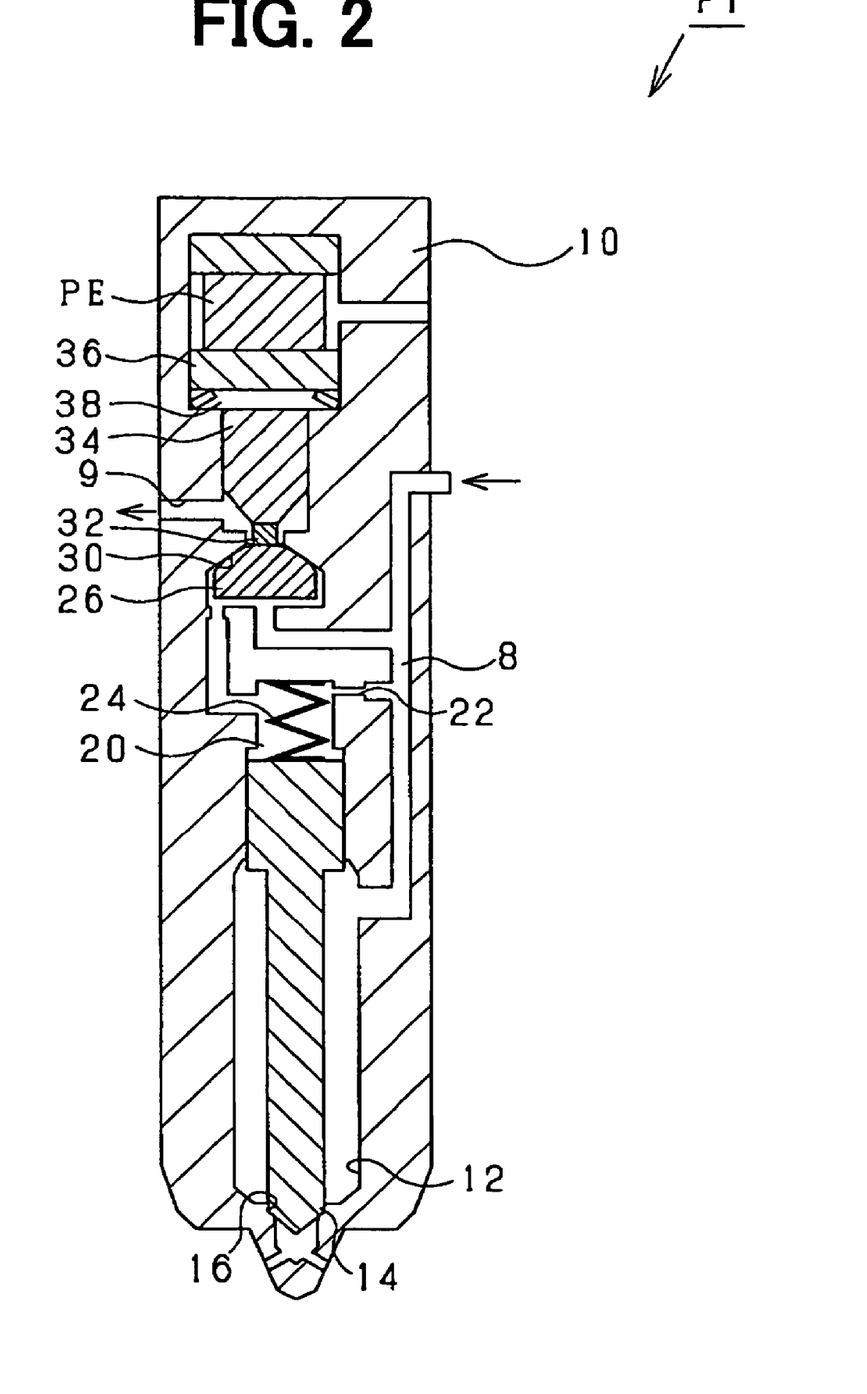
FIG. 2 is a sectional view showing a piezo-injector used in the first embodiment.

The piezo-injector P1 may be constructed as shown in FIG. 2. Specifically, a columnar needle storing part 12 is provided in a body 10 of piezo-injector PI. The needle storing part 12 stores a nozzle needle 14 movable in its axial direction. When the nozzle needle 14 is seated in a ring-like needle seat part 16 formed in the top end of body 10, the needle storing part 12 is separated from the outside (combustion chamber of the diesel engine). On the other hand, when the nozzle needle 14 leaves the needle seat part 16, the needle storing part 12 is communicated with the outside. The high-pressure fuel fed to the high-pressure fuel passage 8 is fed to the needle storing part 12.

The back surface side of the nozzle needle 14 (the opposite side of a side opposing the needle seat part 16) opposes a back pressure chamber 20. The fuel from the high-pressure fuel passage 8 is supplied to the back pressure chamber 20 via an orifice 22. The back pressure chamber 20 is provided with a needle spring 24 that presses the nozzle needle 14 toward the needle seat part 16.

The back pressure chamber 20 can communicate with the low-pressure fuel passage 9 via a ball 26. When the ball 26 is seated in a ring-like valve seat part 30 on the side of its back surface, the low-pressure fuel passage 9 and the back pressure chamber 20 are disconnected from each other. When the ball 26 shifts toward the top end of the body 10, the low-pressure fuel passage 9 is communicated with the back pressure chamber 20.

The ball 26 is coupled with a small-diameter piston 34 on the side of the valve seat part 30 via a pressure pin 32. The back side of the small-diameter piston 34 opposes the end of a large-diameter piston 36 larger in diameter than the small-diameter piston 34. A shift transfer chamber 38 is formed by being partitioned by the small-diameter piston 34, the large-diameter piston 36 and the inner peripheral surface of the body 10. The shift transfer chamber 38 is filled with proper fluid such as fuel.

On the other hand, the large-diameter piston 36 is coupled with a piezoelectric element PE at the rear of the body 10. The piezoelectric element PE is secured to the body 10 at the back of a side opposing the large-diameter piston 36.

The piezoelectric element PE includes a laminated member (piezostack) with multiple piezoelectric elements stacked, which expands and contracts because of inverse piezoelectric effects to make the piezoelectric element PE function as an actuator. Specifically, the piezoelectric element PE is a capacitive load, which expands when charged, and contracts when discharged. The piezoelectric element PE according to this embodiment uses a piezoelectric element of a piezoelectric material such as PZT.

When the piezoelectric element PE is not fed with current and is in a contracted state, since force is exerted by the high-pressure fuel of the high-pressure fuel passage 8, the ball 26 and the small-diameter piston 34 are biased in the rear direction (upward in FIG. 2) and positioned in the rear of the body 10. In this case, the back pressure chamber 20 and the low-pressure fuel passage 9 are disconnected from each other by the ball 26. Accordingly, the nozzle needle 14 is pressed toward the top end of the body 10 by fuel pressure (the pressure of fuel in the common rail 6) in the back pressure chamber 20 and the needle spring 24, and is seated in the needle seat part 16 (valve close state).

On the other hand, when the piezoelectric element PE is fed with a current and consequently expands, the ball 26 moves toward the top end of the body 10. Thereby, the back pressure chamber 20 is communicated with the low-pressure fuel passage 9. As a result, the pressure of fuel in the back pressure chamber 20 decreases. When the force by which the high-pressure fuel in the needle storing part 12 presses the nozzle needle 14 toward the rear of the body 10 becomes by a predetermined amount greater than the force by which the fuel in the back pressure chamber 20 and the needle spring 24 press the nozzle needle 14 toward the top end of the body 10, the nozzle needle 14 leaves from the needle seat part 16 (valve open state for fuel injection from the injector PI).

The engine system shown in FIG. 1 includes sensors for detecting the operating states of the diesel engine, such as a pressure sensor 40 for detecting the pressure of fuel in the common rail 6, a crank angle sensor 42 for detecting the angle of a crankshaft of the engine, a coolant temperature sensor 44 for detecting the temperature of coolant, and a battery voltage sensor 46 for detecting the voltage of a battery. The engine system includes a sensor for detecting the operating states of a vehicle in which the system is installed, such as a vehicle speed sensor 48 for detecting the travel speeds of the vehicle.

Figure 3:
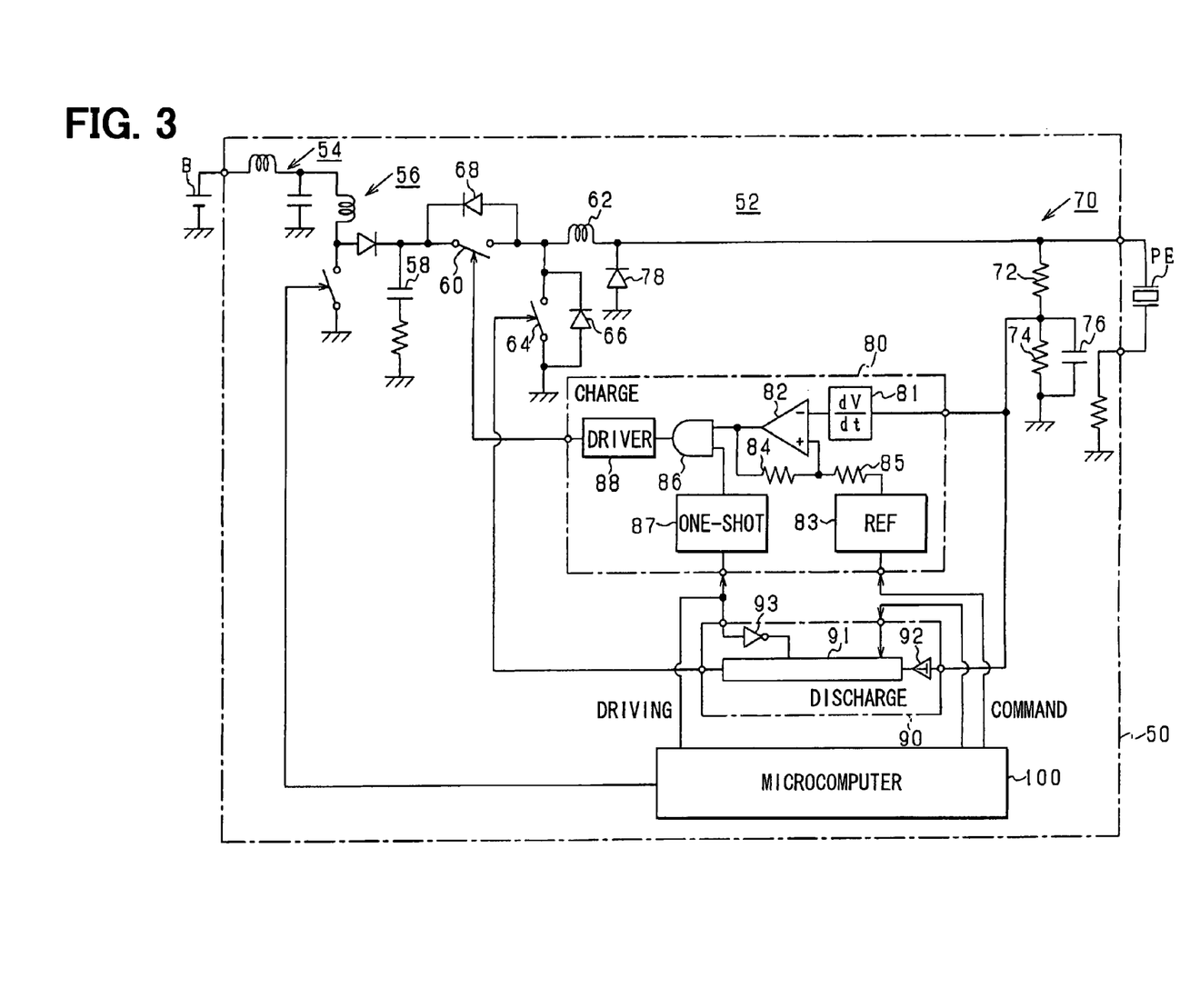
FIG. 3 is a circuit diagram showing the driving apparatus of the first embodiment.

The detection results of these various sensors are applied to an electronic control unit 50 provided as a piezo-injector driving apparatus. According to the detection values, the control unit 50 operates various actuators of the diesel engine such as the piezo-injectors PI. The control unit 50 may be constructed as shown in FIG. 3, and charges and discharges the piezoelectric element PE provided in the piezo-injectors PI in the following manner.

The control unit 50 includes a driving circuit 52, a charge switch operation circuit 80, a discharge switch operation circuit 90, and a microcomputer 100.

Power supplied from a battery B is supplied via a filter 54 to a DC/DC converter 56, which is a booster or step-up circuit. The DC/DC converter 56 boosts the voltage of the battery B (e.g., 12V) to a higher voltage (e.g., 200 to 300V) for charging the piezoelectric element PE.

The voltage boosted by the DC/DC converter 56 is applied to a capacitor 58. The capacitor 58 has its one terminal connected to the DC/DC converter 56 and another terminal grounded via a resistor. When the voltage boosted by the DC/DC converter 56 is applied to the capacitor 58, the capacitor 58 stores the charges to be supplied to the piezoelectric element PE. It is desirable that the capacitor 58 has such a capacitance (e.g., several 100 μF) as to cause little change in its voltage as a result of one charging operation for the piezoelectric element PE.

A high-potential terminal of the capacitor 58, that is, the DC/DC converter 56 side, is connected to a high-potential terminal of the piezoelectric element PE via a series connection between a charge switch 60 and a charge/discharge coil 62. A low-potential terminal of the piezoelectric element PE is grounded.

One terminal of a discharge switch 64 is connected between the charge switch 60 and the charge/discharge coil 62. The other terminal of the discharge switch 64 is grounded.

A diode 66 is connected in parallel to the discharge switch 64. The diode 66 has the cathode connected between the capacitor 58 and the charge/discharge coil 62 and the anode connected to the grounding side. The diode 66 forms a chopper circuit for charging the piezoelectric element PE in conjunction with the capacitor 58, the charge switch 60, and the charge/discharge coil 62, and functions as a free wheeling (flywheel) diode.

On the other hand, a diode 68 is connected in parallel to the charge switch 60. The diode 68 has the cathode connected to the capacitor 58 and the anode connected to the discharge switch 64. The diode 68 forms a chopper circuit for discharging the piezoelectric element PE in conjunction with the capacitor 58, the charge/discharge coil 62, and the discharge switch 64, and functions as a free wheeling diode.

A voltage detection circuit 70 is connected between the charge/discharge coil 62 and the high-potential terminal of the piezoelectric element PE. The voltage detection circuit 70 is used to detect the potential of the high-potential terminal of the piezoelectric element PE. Specifically, the voltage detection circuit 70 includes a serial connection of resistors 72 and 74, and a capacitor 76 connected in parallel to the resistor 74. A voltage fluctuation of the piezoelectric element PE is smoothed in the voltage detection circuit 70, and is outputted as a potential between the resistors 72 and 74.

A diode 78 connected between the charge/discharge coil 62 and the voltage detection circuit 70 prevents a voltage of the piezoelectric element PE from becoming negative.

The charge switch operation circuit 80 receives a voltage signal outputted from the voltage detection circuit 70 to a voltage change speed calculation circuit 81, and converts it to a signal (voltage signal) corresponding to a voltage change rate. The converted signal is applied to a negative input terminal of a comparator 82. A reference voltage outputted by a reference voltage generating circuit 83 is applied to a positive input terminal of the comparator 82. The comparator 82, a resistor 84 connected between its output terminal and positive input terminal, and a resistor 85 connected between its positive input terminal and the reference voltage generating circuit 83 form a hysteresis comparator. Accordingly, the output of the comparator 82 inverts to a logical low level L when a voltage value of an output signal of the speed calculation circuit 81 rises from less than "reference voltage +ΔV (ΔV: predetermined value)" to "reference voltage +ΔV," and then inverts to a logical high level H when it drops to "reference voltage −ΔV" or less.

The output of the comparator 82 is inputted to one terminal of an AND circuit 86. To another terminal of the AND circuit 86, an output signal of the one-shot circuit 87 that outputs a signal of logical high level H for a predetermined period after a driving signal inputted from the outside becomes a logical high level is inputted. On the other hand, an output signal of the AND circuit 86 is applied to the charge switch 60 after its power is converted by the driver 88.

The discharge switch operation circuit 90 has the same circuit 91 as the charge switch operation circuit 80. Furthermore, the discharge switch operation circuit 90 includes an inversion amplifier 92 that inverts the positive/negative polarity of an output signal of the voltage detection circuit 70 and outputs the inverted signal to the same circuit as the speed calculation circuit 81. Furthermore, the discharge switch operation circuit 90 includes an inverter 93 that captures the driving signal and outputs the signal logically inverted to the same circuit as the one-shot circuit 87.

On the other hand, the microcomputer 100 outputs the driving signal and a command signal for setting a reference voltage of the reference voltage generating circuit 83, based on detection values of various sensors for detecting the operating states of the diesel engine and the operating states of the vehicle.

Figure 4:
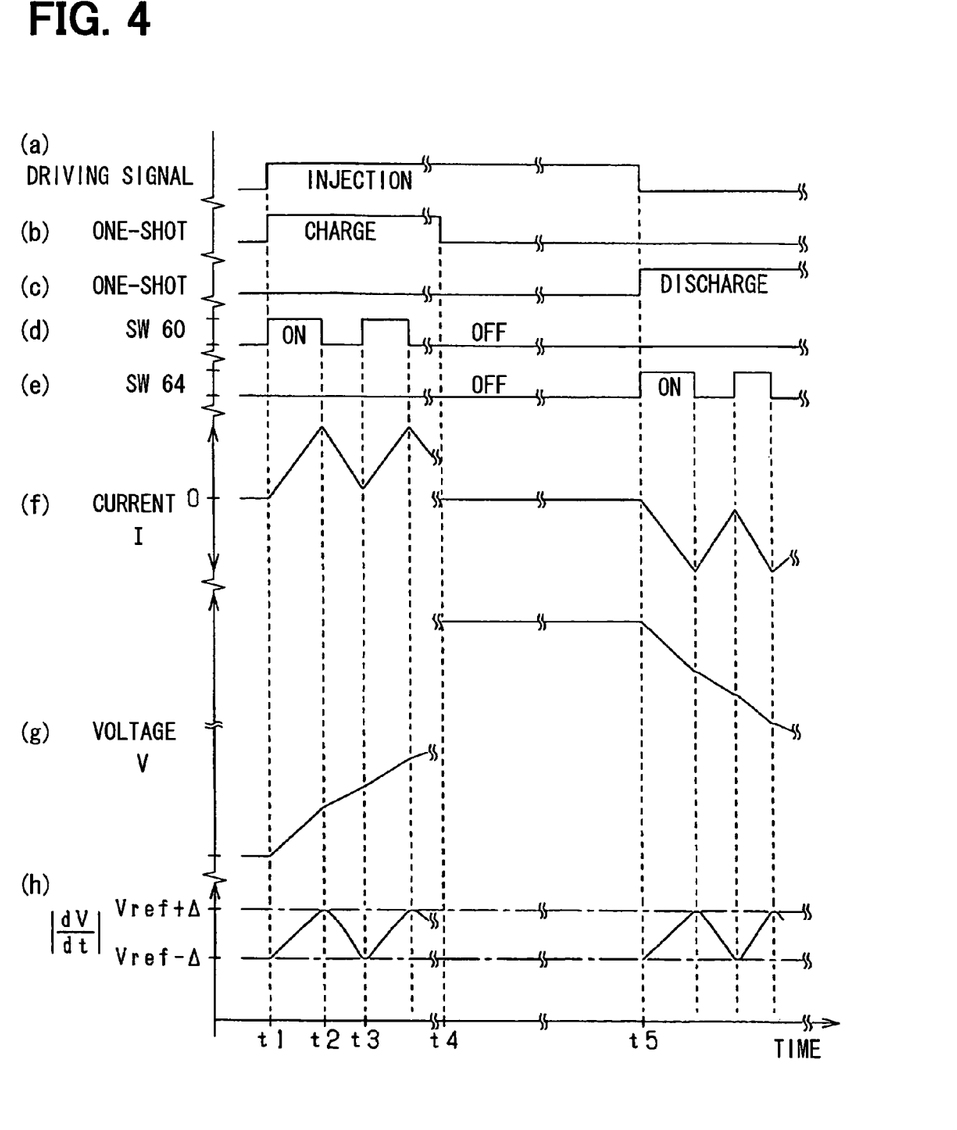
FIG. 4 is a time chart showing a feedback control mode of the first embodiment.

FIG. 4 shows the mode of charging processing and discharging processing. In FIG. 4, (a) shows the transition of the driving signal that is outputted from the microcomputer 100 and indicates an injection period. (b) shows the transition of output of the one-shot circuit 87. (c) shows the transition of output of a one-shot circuit in the discharge switch operation circuit 90. (d) shows the transition of an operation signal of the charge switch 60. (e) shows the transition of an operation signal of the discharge switch 64. (f) shows a current (operation current) I flowing via the piezoelectric element PE. (g) shows the transition of voltages (operation voltages) V of a high-potential terminal of the piezoelectric element PE. (h) shows the transition of the absolute values of change rates of the operation voltage V.

As shown in FIG. 4, when the driving signal outputted from the microcomputer 100 is applied to the charge switch operation circuit 80 at time t1, chopper control is started by turning on or off the charge switch 60 by the charge switch operation circuit 80. That is, with the driving signal being applied, a signal of logical high level is outputted for the predetermined period from the one-shot circuit 87. Since, at this point, the reference voltage Vref is higher than the voltage value of a signal outputted by the speed calculation circuit 81, a signal of logical high level is outputted from the comparator 82. Therefore, the AND circuit 86 produces a logical high level, and the charge switch 60 is turned on. With the charge switch 60 being turned on, a closed-loop circuit comprising the capacitor 58, the charge switch 60, the charge/discharge coil 62, and the piezoelectric element PE is formed. Thereby, the electric charge of the capacitor 58 is discharged to charge the piezoelectric element PE. At this time, the amount of current (operation current) I flowing through the piezoelectric element PE increases, and the voltage (operation voltage) V of the high-potential terminal of the piezoelectric element PE rises.

However, when the rise speed of the operation voltage V becomes higher than the reference voltage Vref by the predetermined value ΔV at time t2, the output of the comparator 82 inverts. Thus, the output of the AND circuit 86 also inverts to a logical low level, and the charge switch 60 is turned off. With the charge switch being turned off, a closed-loop circuit comprising the charge/discharge coil 62, the piezoelectric element PE, and the diode 66 is formed. Thereby, the flywheel energy of the charge/discharge coil 62 is charged to the piezoelectric element PE. At this time, the operation current decreases. When the rise speed of the operation voltage becomes lower than the reference voltage Vref by the predetermined value ΔV at time t3, the charge switch 60 is turned on again.

Since, in the above mode, step-down chopper control in which the charge switch 60 is operated is performed over times t1 to t4 during which the output of the one-shot circuit 87 is at logical high level, the piezoelectric element PE is charged, and the potential of the high-potential terminal of the piezoelectric element PE rises.

On the other hand, when the driving signal inverts at time t5, chopper control is started by turning on or off the discharge switch 64 by the discharge switch operation circuit 90. That is, with the driving signal being applied, a signal of logical high level is outputted for the predetermined period from the one-shot circuit within the circuit 91, whereby chopper control is performed over the predetermined period. Specifically, with the discharge switch 64 being turned on, a closed-loop circuit is formed by the discharge switch 64, the charge/discharge coil 62, and the piezoelectric element PE. Thereby, the piezoelectric element PE is discharged. At this time, the amount of current flowing via the piezoelectric element PE decreases. Furthermore, with the discharge switch being turned on, then turned off, a closed-loop circuit is formed by the capacitor 58, the diode 68, the charge/discharge coil 62, and the piezoelectric element PE. Thereby, the flywheel energy of the charge/discharge coil 62 is restored to the capacitor 58. At this time, the amount of current flowing via the piezoelectric element PE increases.

Since step-up chopper control in which the discharge switch 64 is operated is performed in the above mode, the piezoelectric element PE is discharged, and the potential of the high-potential terminal of the piezoelectric element PE decreases. By thus charging or discharging the piezoelectric element PE, the operation voltage V of the piezoelectric element PE can be feedback-controlled. The operation voltage V indicates an electrical state amount having a correlation with the quantity of expansion and contraction of the piezoelectric element PE. By operating the voltage of the piezoelectric element PE, the expansion and contraction of the piezoelectric element PE can be controlled. When the absolute value of the change rate of operation voltages at charge start time and at discharge start time is excessively large, the noise of the piezo-injector PI may become large because a great force is conveyed to the body 10 of the piezo-injector PI when the piezoelectric element PE starts to move.

Figure 5:
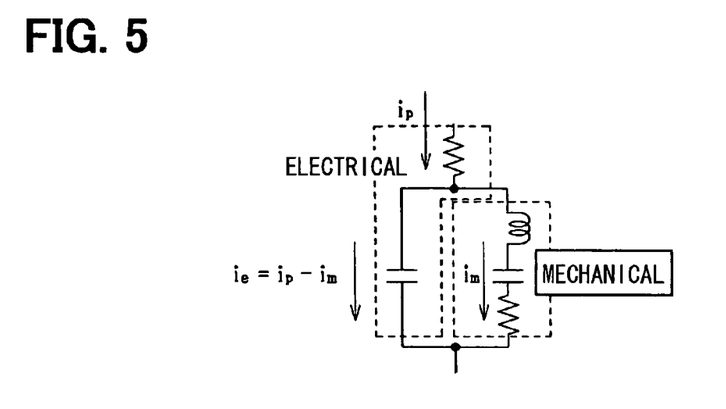
FIG. 5 is a circuit diagram for explaining that power may be wastefully consumed in a piezoelectric element.

When the absolute value of the change rate of operation voltages at charge end time is excessively large, the vibration of the piezoelectric element PE becomes large. When the vibration of the piezoelectric element PE is large, the amount of energy consumed wastefully due to factors other than energy for driving the piezoelectric element PE becomes large. This is because an equivalent circuit of the piezoelectric element PE is formed, as shown in FIG. 5, by a mechanical component represented as a series circuit of LCR and an electrical component represented by a capacitor connected in parallel to a series circuit of LCR and a series equivalent resistor connected in series with the parallel circuit. Therefore, when the piezoelectric element PE vibrates, the quantity of current consumed by the series equivalent resistor increases, and the amount of energy consumed wastefully without making a contribution to the driving of the piezoelectric element PE increases. An increase in such a loss of energy will reduce control precision of expansion and contraction of the piezoelectric element PE.

Furthermore, when the absolute value of the change rate of operation voltages at discharge end time is large, the ball 26 shown in FIG. 2 is seated in the valve seat part 30 at an increasing speed, the sound at the time of the seating may increase, and the ball 26 may be bounded after being seated in the valve seat 30, opening the valve of the nozzle needle 14 again. Additionally, when the absolute value of the change rate of operation voltages at discharge end time is large, energy loss due to an increase in the vibration of the piezoelectric element PE may reduce the amount of energy restored to the capacitor 58.

In this embodiment, the absolute value of the change rate of operation voltages is increased after the charging or discharging of the piezoelectric element PE is started, and the absolute value of the change rate of operation voltages is decreased when the charging or discharging is terminated.

Figure 6A:
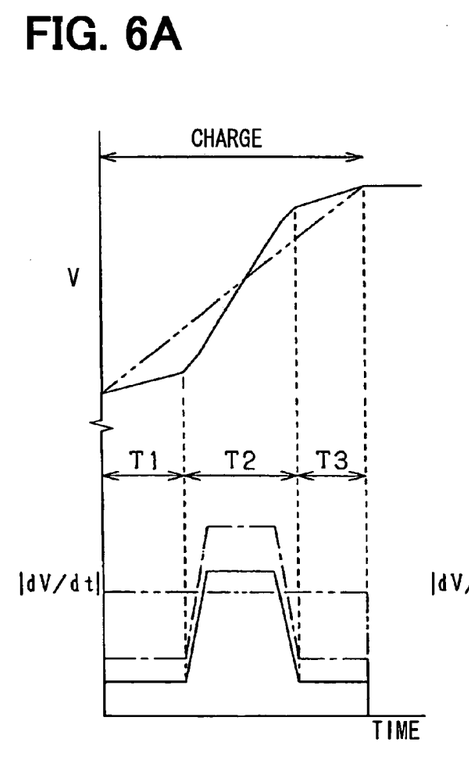
FIGS. 6A and 6B are time charts showing operation voltage patterns and patterns of the absolute values of change rates of operation voltages in the first embodiment.
Figure 6B:
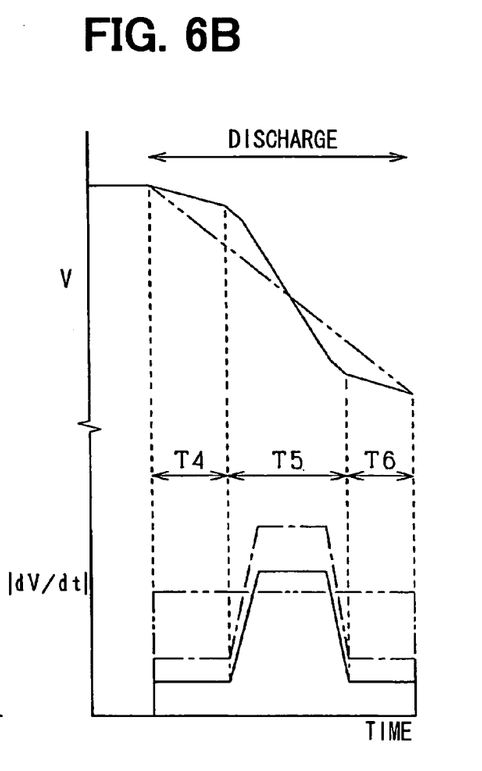

FIGS. 6A and 6B show examples of setting operation voltages in this embodiment. FIG. 6A shows the transition of operation voltage during charging, and the transition of the absolute values of change rates of operation voltages during charging. FIG. 6B shows the transition of operation voltage during discharging, and the transition of the absolute values of change rates of operation voltages during discharging. As shown in FIGS. 6A and 6B, the profiles of operation voltages shown in solid lines are in the shape of the letter S during charging, and in the shape of a mirror image of the letter S during discharging. This can be achieved by reducing the absolute values of change rates of operation voltages at start time and at end time, and increasing them in a period between them. The case in which the above absolute values are constant is shown by alternate long and two short dashes line.

Figure 7A:
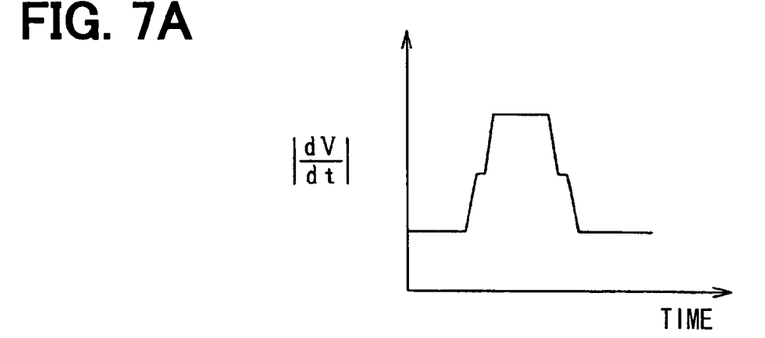
FIGS. 7A and 7B are time charts showing patterns of the absolute values of change rates of operation voltages in the first embodiment.
Figure 7B:
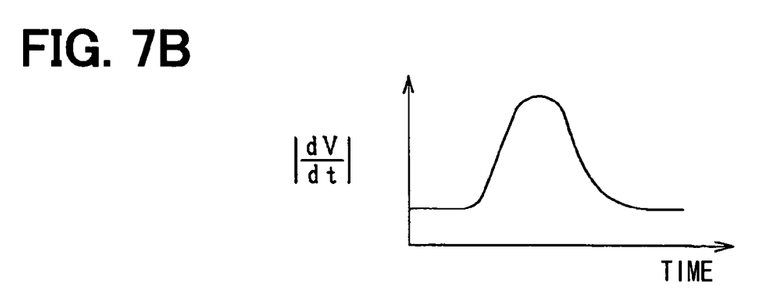

FIGS. 7A and 7B show other examples of a mode of setting operation voltages in this embodiment. FIGS. 7A an 7B both show the transition of the absolute values of change rates of operation voltages. In any of these cases, the absolute values of change rates are set small at start time and at end time, and set large in a period between them. Specifically, FIG. 7A shows an example that the absolute values of change rates of operation voltages increase in stages (two stages in this example) like FIGS. 6A and 6B, and then decreases in stages (two stages in this example). FIG. 7B shows an example that the absolute values of change rates of operation voltages are continuously increased, and then continuously decreased.

Changing the absolute values in the period of charging or in the period of discharging can be performed by changing the reference voltages in the charge switch operation circuit 80 or the discharge switch operation circuit 90 as shown in FIG. 3.

Figure 8:
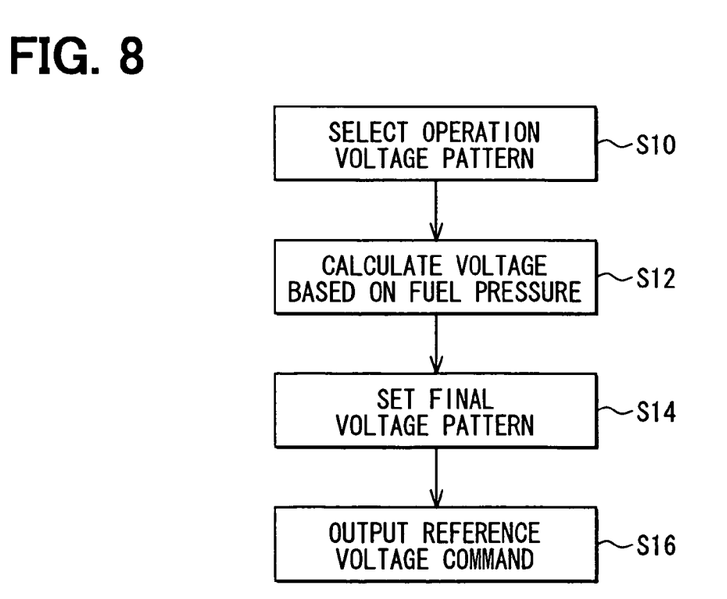
FIG. 8 is a flowchart showing a setting mode of an operation voltage pattern in the first embodiment.

Processing for achieving operations in the modes shown in FIGS. 6A, 6B and FIGS. 7A and 7B may be made by the microcomputer 100 as shown in FIG. 8.

In this processing, at step S10, an operation voltage pattern is selected based on the voltage of the battery B detected by the battery voltage sensor 46, the vehicle speed detected by the vehicle speed sensor 48, the rotation speed detected by the crank angle sensor 42, and the temperature of coolant detected by the coolant temperature sensor 44. The selection of a pattern of operation voltages denotes that one is selected from among the plural patterns illustrated in FIGS. 6A, 6B, 7A, 7B as the patterns of the absolute values of change rates of operation voltages during charging.

An optimum pattern as the above pattern is changeable depending on the operating states of the engine and the operating states of the vehicle. For example, during idle rotation control under a vehicle speed of zero, there is no annoying noise in the vehicle and a sound generated by the piezo-injector P1 is prone to be recognized as a noise by a user. Accordingly, it is desirable that the sound generated by the piezo-injector P1 is controlled. When the temperature of the piezo-injector PI is low, the friction between the body 10 and various members (nozzle needle 14, small-diameter piston 34, and large-diameter piston 36, and the like) that move in the body 10 becomes large. Therefore, this fact must be taken into account to decide the above pattern. When the temperature of fuel fed to the piezo-injector PI is low, the viscosity of the fuel increases. Therefore, this fact must also be taken into account to decide the above pattern. Furthermore, if the voltage of the battery B is low at cold engine starting, since the piezoelectric element PE cannot be desirably charged, in some cases, it is desirable to preferentially perform the operation of increasing the amount of charging for the piezoelectric element PE.

From such a viewpoint, a pattern is selected based on the above parameters. Here, vehicle speed and rotation speed are examples of parameters for determining whether a given situation is the situation in which the noise of the piezo-injector PI is easily recognized by a user, and coolant temperature is an example of a parameter having a correlation with the temperature of the piezo-injector PI and the temperature of fuel.

Step S12 calculates the magnitude of a required operation voltage, based on the pressure of fuel in the common rail 6 detected by the fuel pressure sensor 40. The fuel pressure is a factor to change energy required to open the valve of the piezo-injector PI. This is because, to open the valve of the piezo-injector PI, that is, to shift the nozzle needle 14 shown in FIG. 2 toward the rear of the body 10, a force must be generated by the piezoelectric element PE to overcome a force by which the fuel in the high-pressure fuel passage 8 pushes the ball 26 to the valve seat part 30. Therefore, in this embodiment, the magnitude of operation voltages is set to be changeable according to a fuel pressure.

Step S14 sets a final operation voltage pattern from the pattern selected by the Step S10 and the magnitude calculated by Step S14. This is done by multiplying the operation voltage pattern by a correction factor as shown by alternate long and short dash line in FIGS. 6A and 6B. Specifically, by multiplying the absolute value of a change rate of operation voltages in each of periods T1 to T3 shown in FIG. 6A by a same correction factor, the absolute value of a change rate of an operation voltage at each time is enlarged (or reduced) with an equal magnification. Also, by multiplying the absolute value of a change rate of operation voltages in each of periods T4 to T6 shown in FIG. 6B by a same correction factor, the absolute value of a change rate of an operation voltage at each time is enlarged (or reduced) with an equal magnification. Likewise, for the patterns of the absolute values of change rates of operation voltages shown in FIGS. 7A and 7B, a value at each time is multiplied by a same correction factor.

Step S16, to match the final operation voltage pattern, outputs a command signal for setting a reference voltage outputted by the reference voltage generating circuit 83 of the charge switch operation circuit 80 shown in FIG. 3, and the reference voltage of the discharge switch operation circuit 90. Thereby, feedback control is performed by the charge switch operation circuit 80 and the discharge switch operation circuit 90 so that the absolute value of a change rate of operation voltages of the piezoelectric element PE made equal to that set at step S14.

According to the first embodiment, the following advantages will be provided.

(1) In charging or discharging of the piezoelectric element PE, operation voltages are set so that the absolute value of a change rate of the operation voltages is increased after the charging or discharging of the piezoelectric element PE is started, and the absolute value of a change rate of the operation voltages is decreased when the charging or discharging is terminated. Thereby, while high responsiveness is maintained, disadvantages occurring at the start and the end of charging or discharging of the piezoelectric element PE can be suitably overcome.

(2) Based on the operating states of a diesel engine and the operating states of a vehicle in which the engine is mounted, a profile (pattern of an operation voltage pattern) representing the transition of operation voltages with respect to time is selected. Thereby, under the condition of restraining a noise level within a permissible range, high responsiveness and other requirements can be suitably satisfied.

(3) When a fuel pressure in the common rail 6 is higher, a pattern of the absolute values of change rates of operation voltages is made greater in magnitude. Thereby, when a required driving force is greater, a greater driving force can be supplied to the piezoelectric element PE, so that a driving force most fitted to a need can be afforded.

(4) With a correction factor corresponding to the pressure of fuel in the common rail 6, the absolute value of a change rate of operation voltages is increased or decreased. Thereby, even if required energy is different, a profile can be easily set.

(5) Operation voltages are monitored by the voltage detection circuit 70 and the like, and feedback control is performed to make a pattern in which actual operation voltages are set. Thereby, actual operation voltages can be made to match the pattern.

(6) The circuit 52 for driving the piezoelectric element PE includes switching devices (charge switch 60 and discharge switch 64) for chopper control, by repeatedly turning on and off these elements, the amount of current flowing through the piezoelectric element PE is repeatedly increased and decreased to control the expansion and contraction of the piezoelectric element PE. Thereby, the piezoelectric element PE can be charged and discharged with a simple construction.

Second Embodiment

The capacitance of the piezoelectric element PE tends to change greatly depending on temperatures. Accordingly, even if the same operation voltage is applied, the amount of expansion or contraction (shift amount) of the piezoelectric element PE may change depending on temperatures. When voltages applied to the piezoelectric element PE are operated to control the expansion and contraction of the piezoelectric element PE, the expansion rate and the contraction rate of the piezoelectric element PE also change depending on temperatures. Accordingly, control of the expansion and contraction of the piezoelectric element PE that uses voltages applied to the piezoelectric element PE as operation amounts involves difficulties attributed to a change in temperatures of the piezoelectric element PE.

In the second embodiment, as an operation amount for controlling the expansion and contraction of the piezoelectric element PE, electrical energy flowing into the piezoelectric element PE from the outside is used. The relationship between the electrical energy (integral value of voltage and current of the piezoelectric element PE) and an expansion and contraction amount of the piezoelectric element PE is not so heavily dependent on a change in temperatures. Accordingly, by using the electrical energy as an operation amount, an expansion and contraction amount and an expansion and contraction rate of the piezoelectric element PE can be precisely controlled without performing temperature corrections.

Figure 9:
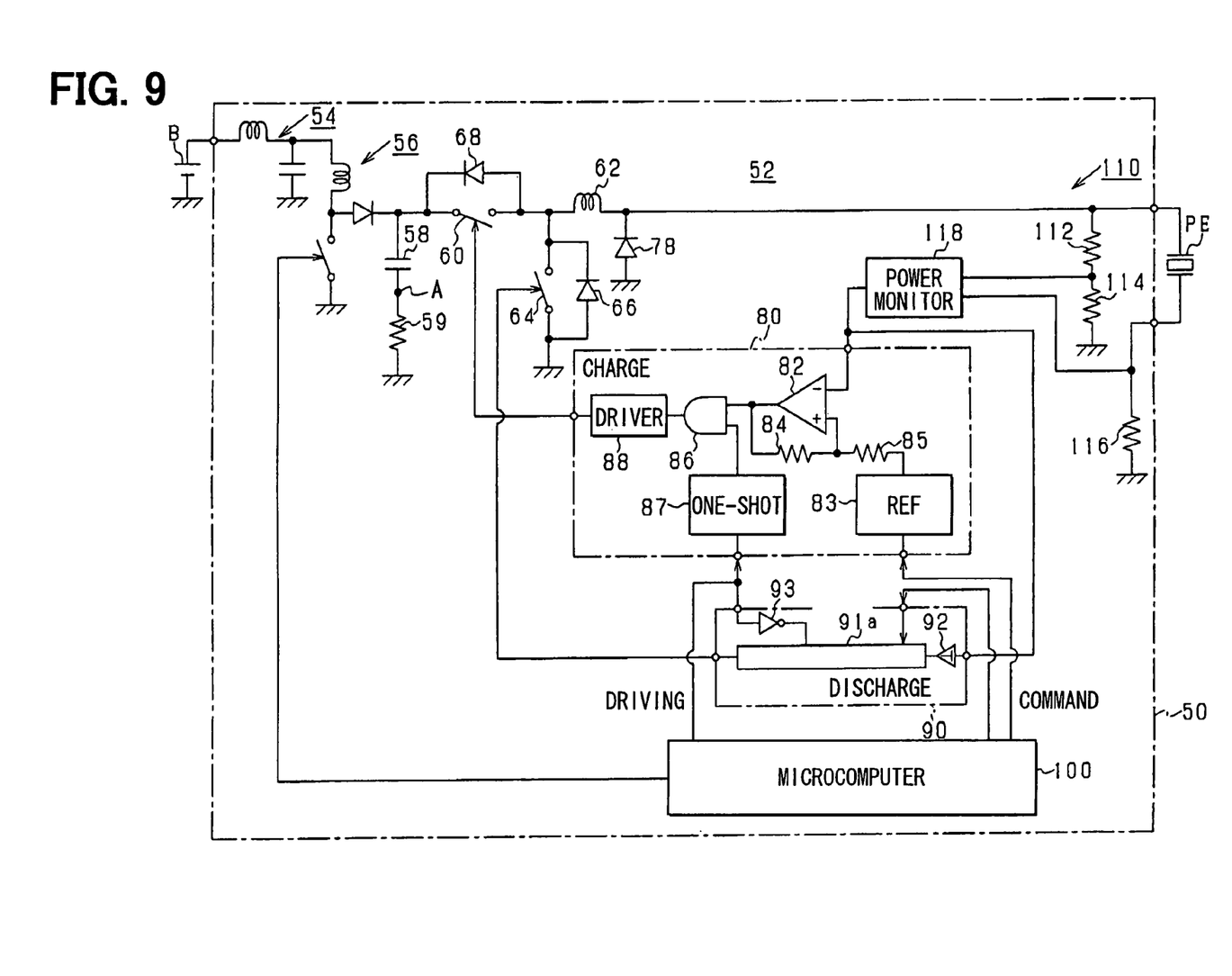
FIG. 9 is a circuit diagram showing a piezo-injector driving apparatus according to a second embodiment of the present invention.

For this reason, a control unit 50 is constructed as shown in FIG. 9. Although very similar to the control circuit 50 in the first embodiment (FIG. 3) in many aspects, the control circuit 50 in FIG. 9 is provided with a voltage detection circuit 110 that detects a voltage of a high-potential terminal of the piezoelectric element PE. The voltage detection circuit 110 comprises a series connection of resistors 112 and 114, and a voltage between the resistors 112 and 114 is applied to a power monitor circuit 118. The power monitor circuit 118 monitors power (a change rate of electrical energy of the piezoelectric element PE) flowing into and out of the piezoelectric element PE, based on the above voltage, and a voltage (a voltage value corresponding to a current flowing through the piezoelectric element PE) between the piezoelectric element PE and the resistor 116, and generates a power signal (a voltage value in this example) corresponding to the power to a charge switch operation circuit 80 and a discharge switch operation circuit 90.

The power signal is applied to a negative input terminal of a comparator 82 in the charge switch operation circuit 80. A circuit 91a in the discharge switch operation circuit 90 has the same construction as the charge switch operation circuit 80. A signal to which the power signal is inverted by the inversion amplifier 92 is applied to a negative input terminal of a comparator in the circuit 91a.

Figure 10A:
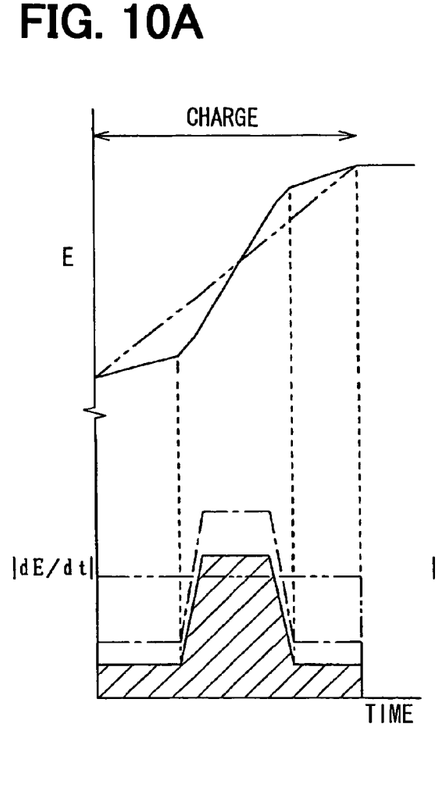
FIGS. 10A and 10B are time charts showing electrical energy patterns and power patterns in the second embodiment.
Figure 10B:
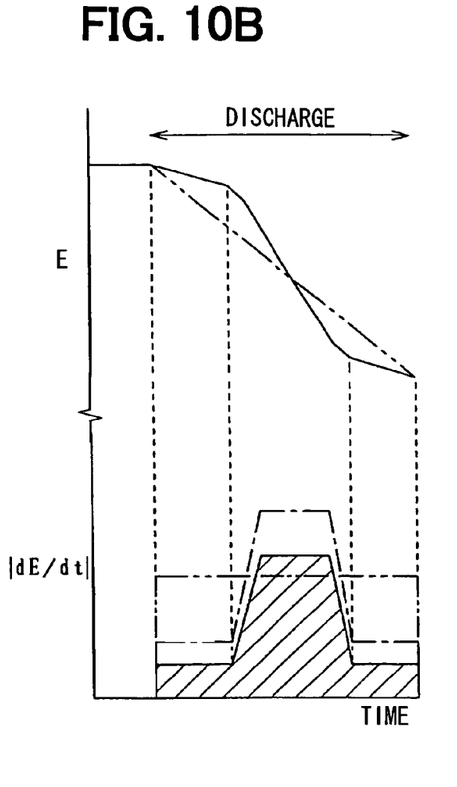

FIGS. 10A and 10B show examples of electrical energy patterns according to this embodiment. FIG. 10A shows the transition of electrical energy E during charging, and the solid line shows the transition of the absolute values of change rates dE/dt of the electrical energy E during charging. FIG. 10B shows the transition of electrical energy E during discharging, and the solid line shows the transition of the absolute values of change rates dE/dt of the electrical energy during discharging. The profiles of electrical energy E are in the shape of the letter S (solid line) during charging, and in the shape of a mirror image of the letter S (solid line) during discharging. This can be achieved by reducing the absolute values of change rates of electrical energy at start time and at end time, and increasing them in a period between them. The case in which the above absolute values are constant is shown by alternate long and two short dashes line.

Figure 11A:
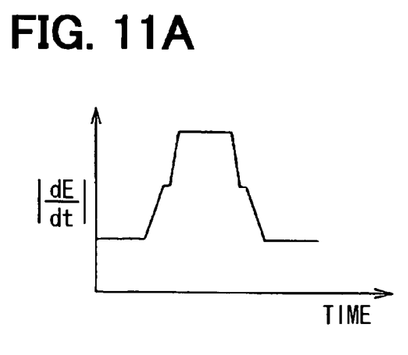
FIGS. 11A and 11B are time charts showing power patterns in the second embodiment.
Figure 11B:
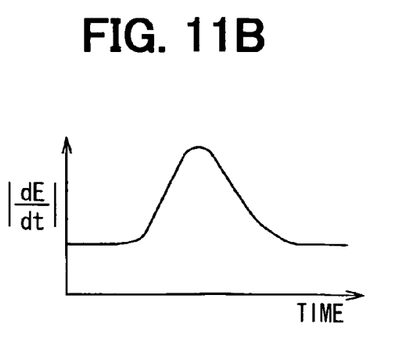

FIGS. 11A and 11B show other examples of a mode of setting electrical energy in this embodiment. FIGS. 11A and 11B both show the transition of the absolute values of change rates dE/dt of electrical energy. In any of these cases, the absolute values of change rates of electrical energy are set small at start time and at end time, and set large in a period between them. Specifically, FIG. 11A shows an example that the absolute values of change rates of electrical energy are increased in stages (two stages in this example), and then decreased in stages (two stages in this example). FIG. 11B shows an example that the absolute values of change rates of electrical energy are continuously increased, and then continuously decreased.

Figure 12:
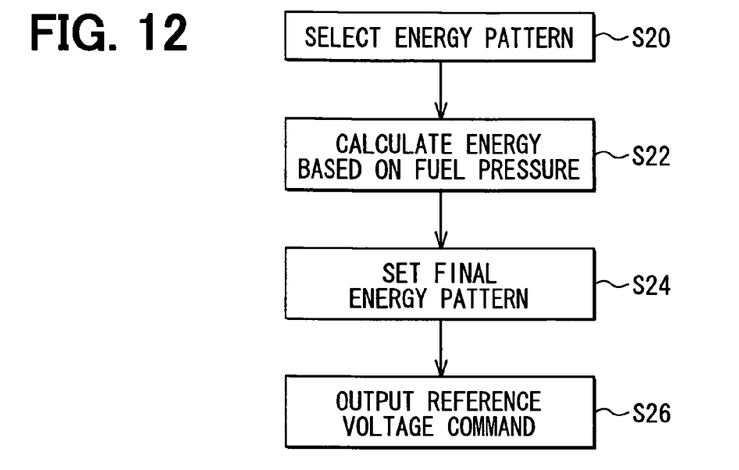
FIG. 12 is a flowchart showing a setting mode of an operation energy pattern in the second embodiment.

Processing for achieving the above operation may be performed by the microcomputer 100 in the manner shown in FIG. 12.

In the series of processing, at step S20, an electric energy pattern is selected based on the voltage of the battery B, a vehicle speed, a rotation speed, and the temperature of coolant. The selection of a pattern of electrical energy denotes that one is selected from among the plural patterns illustrated in FIGS. 10A, 10B, 11A and 11B as the transition of the absolute values of change rates dE/dt of electrical energy E. The reason of the pattern-based selection is the same as that at step S10 in FIG. 8.

Step S22 calculates required energy, based on the pressure of fuel in the common rail 6 detected by the fuel pressure sensor 40. Step S24 sets a final pattern of electrical energy so that the pattern selected at Step S20 matches the energy calculated at Step S22. The setting of the final pattern is performed by increasing or decreasing the absolute value of a change rate at each time with an equal magnification, as shown by the alternate long and short dash line in FIGS. 10A and 10B, like step S14 in FIG. 8.

Step S26, to match the final pattern of electrical energy, outputs a command signal for setting a reference voltage outputted by the reference voltage generating circuit 83 of the charge switch operation circuit 80 shown in FIG. 9, and a reference voltage of the discharge switch operation circuit 90. Thereby, feedback control is performed by the charge switch operation circuit 80 and the discharge switch operation circuit 90 so that a change rate of electrical energy of the piezoelectric element PE is equal to that set at step S24.

In this second embodiment, as an operation amount for controlling the expansion and contraction of the piezoelectric element PE, electrical energy is used. Thereby, a shift amount of the piezoelectric element PE can be precisely controlled regardless of a change in temperatures. Specifically, when a final pattern of electrical energy is equal to a pattern shown by the sold line in FIG. 10A, a shift amount of the piezoelectric element PE is determined corresponding to the amount of electrical energy supplied to the piezoelectric element PE having an area (hatched portion) enclosed by the solid line, and the shift amount hardly fluctuates regardless of a change in the temperature of the piezoelectric element PE.

According to the second embodiment, in addition to the above advantages (1) to (6) of the first embodiment, the following advantages are provided.

(7) As an operation amount for controlling the expansion and contraction of the piezoelectric element PE, electrical energy of the piezoelectric element PE is used. Thereby, even if the temperature of the piezoelectric element PE fluctuates, the absolute value of a shift rate of the piezoelectric element PE can be maintained at an appropriate value.

Other Embodiments

The above embodiments may be modified as follows.

In control of the expansion and contraction of the piezoelectric element PE, as a means for setting state amounts so that the absolute value of a change rate of electrical state amounts is increased after the start time, and the absolute value is decreased at the end time, change rate patterns or patterns do not need to be symmetrical between a start time and an end time. The above absolute value may be different between a start time and an end time. Even if state amounts are set in the above modes only for expansion control, disadvantages occurring during the expansion control can be suitably overcome.

As a method for expanding or reducing the absolute values of an operation voltage V and electrical energy E at each time based on the pressure of fuel in the common rail 6, the calculation is not limited to multiplication by a single correction factor. Different correction factors may be multiplied among start time, end time, and a period between them. Furthermore, correction values may be added instead of multiplying correction factors.

Figure 13:
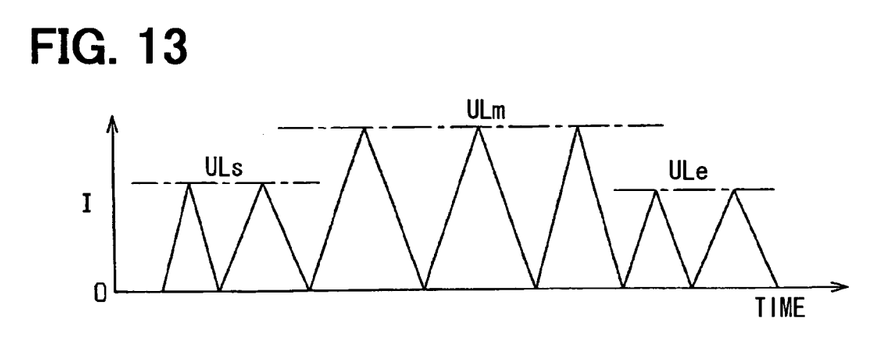
FIG. 13 is a time chart showing the transition of operation currents in a variant of the first embodiment.

In the first embodiment, operation voltages are monitored, and to match the operation voltages to a set pattern, feedback control is performed by turning on and off the charge switch 60 and the discharge switch 64. However, the control is not limited to this embodiment. For example, as shown in FIG. 13, when the amount of current flowing via the piezoelectric element PE reaches a predetermined upper limit UL, the charge switch 60 and the discharge switch 64 are switched from ON to OFF, and when the amount of current becomes zero, the charge switch 60 and the discharge switch 64 are switched from OFF to ON. In this case, if the upper limit ULs of the start time and the upper limit ULe of the end time of charging or discharging are set lower than an upper limit ULm in a middle period between them, the patterns shown by the solid lines in FIGS. 6A and 6B can be obtained. By presetting the upper limits ULs, ULm, ULe, open control can be performed. As a means of thus operating the driving circuit 52 to match the set state amounts, the embodiment is not limited to a means of feeding back state amounts to be monitored to the set state amounts. The operation voltage pattern shown in FIG. 7A can be achieved by setting upper limits in two stages in a period between the start time and the end time of charging or discharging.

Figure 14:
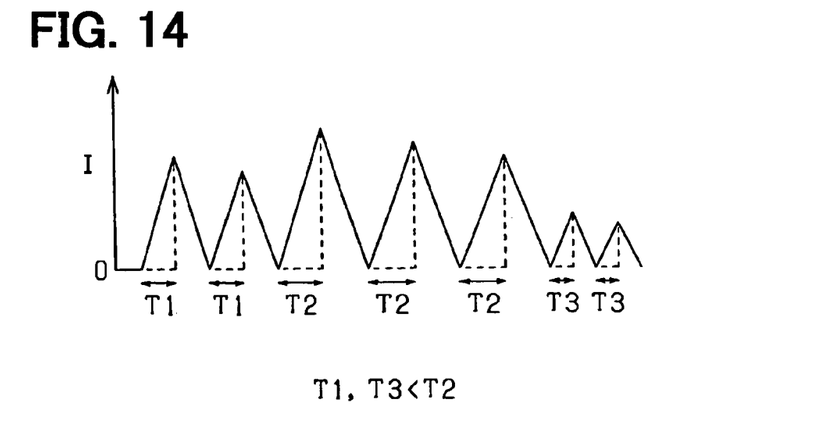
FIG. 14 is a time chart showing the transition of operation currents in a variant of the second embodiment.

In the second embodiment, power flowing into and out of the piezoelectric element PE is monitored, and to match the power to a set pattern, feedback control is performed by turning on and off the charge switch 60 and the discharge switch 64. However, the second embodiment is not limited so. For example, as shown in FIG. 14, an on-operation time is set to a predetermined value, and an off-operation may be switched to an on-operation when the amount of current flowing via the piezoelectric element PE becomes zero. In this case, by setting on-operation times T1 and T3 of the start time and the end time of charging or discharging smaller than an on-operation time T2 in a middle period between them, the patterns shown by the solid lines in FIGS. 10A and 10B can be obtained. The power pattern shown in FIG. 11A can be achieved by setting an on-operation time in two stages in a period between the start time and the end time of charging or discharging.

Figure 15A:
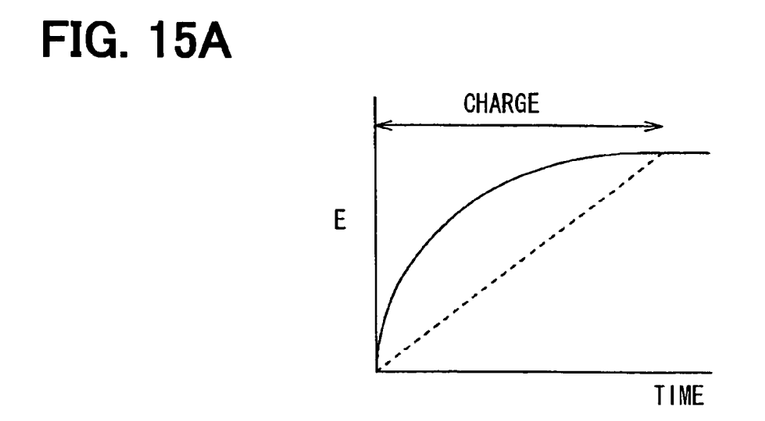
FIGS. 15A to 15C are time charts showing electrical energy patterns and voltage patterns in a variant of the embodiments.
Figure 15B:
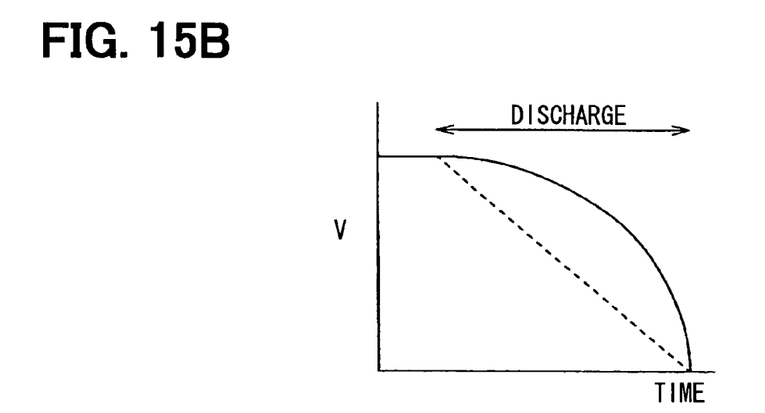
Figure 15C:
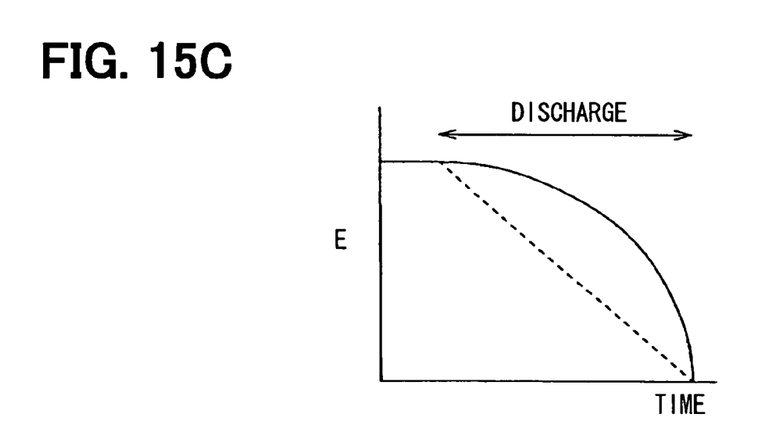

For example, when an electrical energy pattern shown in FIG. 15A is used, since a rise rate of electrical energy of the piezoelectric element PE decreases at the end of charging, the above problem occurring because of an excess of energy supplied at the end time of charging the piezoelectric element PE can be suppressed. Moreover, for example, when an operation voltage pattern shown in FIG. 15B is used, since a fall rate of operation voltages of the piezoelectric element PE at the start of discharging is small, the above problem occurring because of an excess of the absolute value of a change rate of operation voltages at the start of discharging the piezoelectric element PE can be suppressed. Furthermore, when an electrical energy pattern shown in FIG. 15C is used, since a fall rate of electrical energy of the piezoelectric element PE at the start of discharging is small, the above problem occurring because of an excess of a fall rate of energy at the start of discharging the piezoelectric element PE can be suppressed.

An apparatus for driving the piezo-injector PI is not limited to those shown in FIGS. 3 and 9. A circuit for calculating power supplied to the piezoelectric element PE is not limited to the circuit that calculates power, based on a voltage of a high-potential terminal of the piezoelectric element PE and a current flowing via the piezoelectric element PE, as shown in FIG. 9. In place of the circuit, the electric power may be calculated based on the amount of current flowing via the capacitor 58 shown in FIG. 9 detected by detecting a potential between the capacitor 58 and the resistor 59 (node A). The product of the current amount and a voltage of the capacitor 58 (specifically, an average value in the short period) is equal to power supplied to the piezoelectric element PE. If setting is made so that the voltage of the capacitor 58 is little affected by charging processing and discharging processing, power can be simply calculated based on the above current value.

A driving circuit may be used which performs chopper control by using a flyback current of a transformer, as disclosed in JP 8-177678A. The piezoelectric element PE may be charged or discharged by a method other than chopper control.

The structure of the piezo-injector PI is not limited to the structure shown in FIG. 2. Besides injectors that perform two-way operations such as valve opening and valve closing according to a shift of a piezoelectric element, injectors are also available which can continuously adjust a lift amount of a nozzle needle according to a shift of the piezoelectric element PE, as disclosed in U.S. Pat. No. 6,520,423. However, when a motive power transfer system in the piezo-injector PI that transfers the motive power of the piezoelectric element PE is constructed so that fuel pressure is applied in opposition to a shift of the piezoelectric element PE when the piezoelectric element PE starts to shift, it is particularly effective to variably set patterns of state amounts and the absolute values of change rates of the state amounts according to the fuel pressure.

Internal combustion engines, without being limited to diesel engines, may be gasoline engines of in-cylinder injection type.

What is claimed is:

1. A driving apparatus for a piezo-injector including a piezoelectric element, the apparatus comprising:
    a driving circuit for controlling electrical charging and discharging of the piezoelectric element corresponding to expansion and contraction of the piezoelectric element;
    a setting circuit that is configured to set, in control of at least one of (i) expansion and (ii) contraction in each fuel injection operation of the piezoelectric element, the rate of change in the electrical charge state after a start period of the control to a value larger than that in the start period, and the rate of change in the electrical charge state amounts in an end period preceding an end of the control to a value smaller than that in a period following the start period, the electrical charge state being variable with at least a voltage of the piezoelectric element; and
    an operation circuit that operates the driving circuit rates of charging and discharging to match the set rates of change.

2. The driving apparatus according to claim 1, further comprising:
    a detector that detects at least one of an (i) operating state of an internal combustion engine in which the piezo-injector is mounted, and (ii) an operating state of a vehicle in which the internal combustion engine is mounted,
    wherein the setting circuit sets a profile of charging and discharging amounts, based on a detection result of the sensor.

3. The driving apparatus according to claim 2,
    wherein the setting circuit sets the profile by variably setting a pattern of the absolute values of rates of change of charging and discharging amounts based on the detection result.

4. The driving apparatus according to claim 2,
    wherein the setting circuit increases or decreases the absolute value of a rate of change of controlled transition at each time based on the detection result.

5. The driving apparatus according to claim 2, wherein:
    the detector detects pressure of fuel supplied to the piezo-injector; and
    as the pressure of fuel detected by the detector is higher, the setting circuit makes the pattern of the absolute values of rates of change larger.

6. The driving apparatus according to claim 1, further comprising:
- a monitor circuit that monitors the charging and discharging amounts,
- wherein the operation circuit feedback-controls an actual charging and discharging amount monitored by the monitoring circuit so that the actual amount matches an amount set by the setting circuit.

7. The driving apparatus according to claim 1,
- wherein the charging and discharging amounts are at least one (i) of the voltage of the piezoelectric element and (ii) electrical energy of the piezoelectric element, which varies with voltage across and current through the piezoelectric element.

8. The driving apparatus according to claim 1, wherein:
- the driving circuit includes a switching device for chopper control; and
- the operation circuit repeatedly increases and decreases the amount of a current flowing in the piezoelectric element by repeatedly turning on and off the switching device to perform the at least one of the expansion and contraction of the piezoelectric element.

9. A driving apparatus for a piezo-injector including a piezoelectric element, the apparatus comprising:
- a driving circuit for controlling electrical charging and discharging of the piezoelectric element correlated with amounts of expansion and contraction of the piezoelectric element;
- a setting circuit configured to set charging and discharging amounts to decrease a rate of change in electrical energy of the piezoelectric element in an end period just before an end of charging the piezoelectric element to an end value smaller than a preceding value in each charging operation of the piezoelectric element, the electrical energy being defined as a function of both current flowing in the piezoelectric element and voltage across the piezoelectric element, and the preceding value being present in a preceding period of the end period and after a start of the charging operation; and
- an operation circuit that operates the driving circuit to match the set amounts.

10. A driving apparatus for a piezo-injector including a piezoelectric element, the apparatus comprising:
- a driving circuit for controlling electrical charging and discharging of the piezoelectric element correlated with amounts of expansion and contraction of the piezoelectric element;
- a setting circuit configured to set charging and discharging amounts to increase the absolute value of a change in the electrical charging amounts of the piezoelectric element in a period subsequent to a preceding period after the start of discharging operation of the piezoelectric element, the amounts being one of (i) a voltage of the piezoelectric element or (ii) an electric power, which is defined as a function of both current flowing in the piezoelectric element and voltage across the piezoelectric element; and
- an operation circuit that operates the driving circuit to match the set amounts.

11. A driving apparatus for a piezo-injector including a piezoelectric element, the apparatus comprising:
- a driving circuit for controlling electrical charging and discharging of the piezoelectric element correlated with amounts of expansion and contraction of the piezoelectric element;
- a detector that detects at least one of (i) an operating state of an internal combustion engine in which the piezoelectric element is mounted and (ii) an operating state of a vehicle in which the internal combustion engine is mounted;
- a setting circuit configured to variably set a pattern for changing the absolute values of rates of change in electrical charging and /or discharging amounts in at least one processing of expansion and contraction of the piezoelectric element within one processing period of each fuel injection operation, based on a detection result of the detector, the electrical amounts being one of across (i) a voltage of the piezoelectric element and (ii) and electric power defined as a function of both voltage and current through the piezoelectric element, and the absolute values being smaller in a start period and an end period of one injection operation processing than that in a period between the start period and the end period; and
- an operation circuit that operates the driving circuit so that the electrical amounts match the pattern set by the setting circuit.

12. A driving apparatus for a piezo-injector including a piezoelectric element, the apparatus comprising:
- a driving circuit for controlling electrical charging and discharging of the piezoelectric element correlated with amounts of expansion and contraction of the piezoelectric element;
- a setting circuit configured to set a pattern for changing rates of change in electrical energy of the piezoelectric element in at least one of the expansion and contraction of the piezoelectric element within one processing period of each fuel injection operation, the electrical energy being variable as a function of both voltage across and current through the piezoelectric element, and the absolute values being smaller in a start period and an end period of the one final injection processing cycle than that in a period between the start period and the end period; and
- an operation circuit that controls the rates of change in electrical energy via the driving circuit to match the set patterns of electrical energy.

13. The driving apparatus according to claim 1,
- wherein the setting circuit is configured to set the electrical amounts for both expansion and contraction of the piezoelectric element.

* * * * *